United States Patent
Johnston et al.

[15] 3,690,353
[45] Sept. 12, 1972

[54] TREE CROSS-CUTTING BLADE ASSEMBLY

[72] Inventors: John S. Johnston; Andre St-Laurent, both of Ottawa, Ontario, Canada

[73] Assignee: Canadian Patents and Development Limited, Ottawa, Ontario, Canada

[22] Filed: Oct. 19, 1970

[21] Appl. No.: 81,774

[52] U.S. Cl. .............................................. 144/34 R
[51] Int. Cl. ............................................ A01g 23/02
[58] Field of Search ........................... 144/34 R, 34 E

[56] References Cited

UNITED STATES PATENTS 3,540,501   11/1970   Jonsson .................... 144/34 E
3,590,894   7/1971   Boyd ........................ 144/34 E

*Primary Examiner*—Gerald A. Dost
*Attorney*—James R. Hughes

[57] ABSTRACT

Tree cross-cutting blade assembly are each trough-shaped with outwardly inclining sides leading from a bottom of the trough which slopes downward and terminates as the blade cutting edges. The blades are mounted for movement towards one another along paths which are substantially straight when viewed in a horizontal direction so that a portion of the tree between the troughs is compressed to alleviate splitting while it is being cut.

5 Claims, 2 Drawing Figures

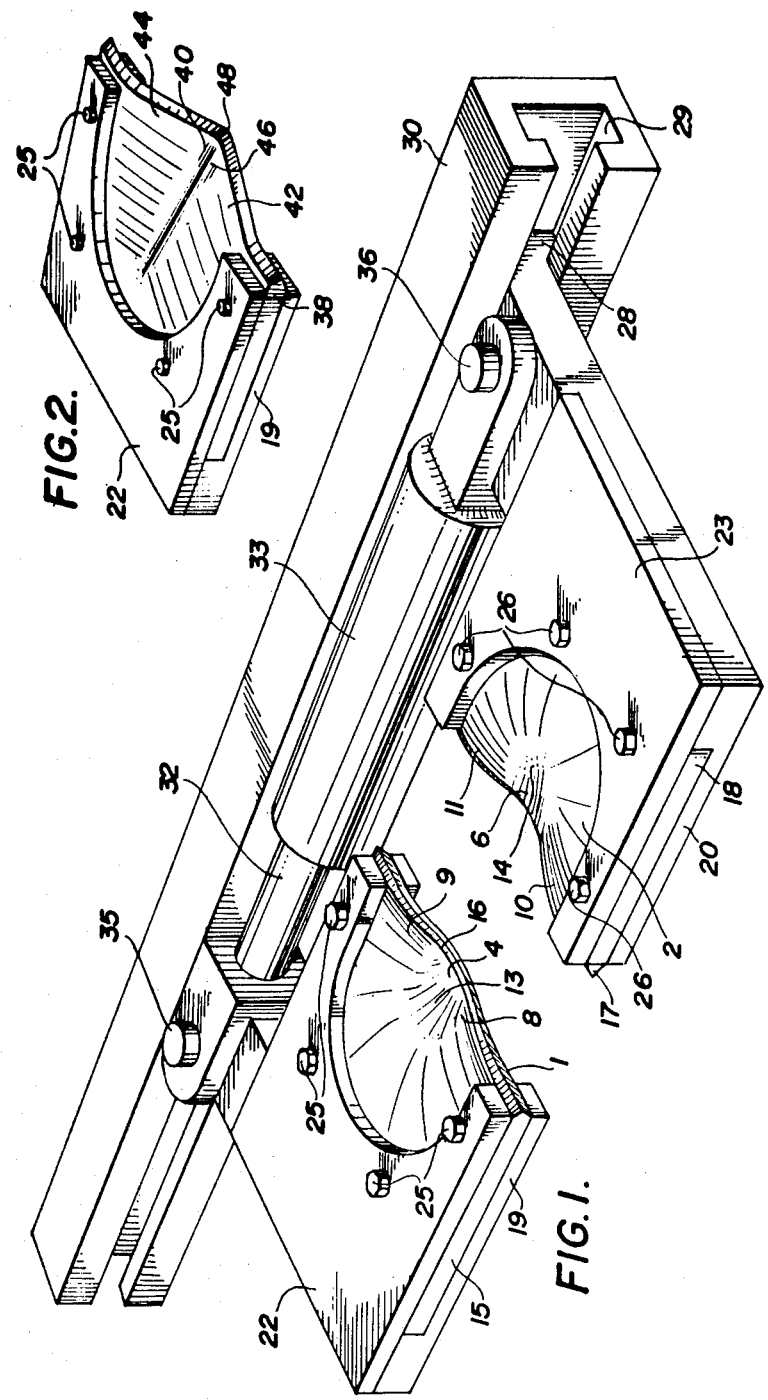

TREE CROSS-CUTTING BLADE ASSEMBLY

This invention relates to a tree cross-cutting blade assembly.

In tree harvesting, rising labor costs have spurred the industry to invest heavily in mechanization. In the felling of trees, for example, tractor mounted tree cross-cutting blades have begun to replace the chain saw because they are faster and lend themselves better to automation.

A major disadvantage with tree cross-cutting blades has been the high degree of splitting damage that has been encountered, particularly when trees are felled by such blades during very cold weather.

It is an object of the invention to provide tree cross-cutting blades wherein damage due to splitting is alleviated.

It will be appreciated that damage due to splitting is only undesirable on the portion of the tree being harvested, that is on the portion of the tree that is severed from the stump. Thus it is sufficient for splitting damage to be alleviated from the portion of the tree being harvested even if this is accomplished at the expense of further splitting being incurred in the stump.

The invention provides a tree cross-cutting blade assembly, wherein at least a portion of each blade is trough-shaped with each trough having outwardly inclining sides leading from a trough bottom inclining downwardly towards and terminating at a tree cutting edge of that blade, and the tree cutting edge forming an open end of that trough for compressing the portion of a tree being cut between the cutting edges, whereby splitting is alleviated in the portion of the tree being compressed.

In the accompanying drawings which illustrate, by way of example, embodiments of the invention, FIG. 1 is a perspective view of a tree cross-cutting blade assembly, and FIG. 2 is a perspective view of a different tree cross-cutting blade.

In FIG. 1 two tree cross-cutting blades 1 and 2 are trough-shaped at 4 and 6 respectively with dependent lower sides. Each trough 4 and 6 has outwardly inclining sides 8, 9 and 10, 11 leading from trough bottoms 13 and 14 respectively which incline downwardly towards and terminating as tree cutting edges 16 and 17. The tree cutting edges 16 and 17 form open ends of the troughs 4 and 6 for compressing the portion of the tree being cut between the cutting edges 16 and 17 the blades 1 and 2 are of uniform thickness and are preferably pressed from flat plate. As will be described later, splitting is alleviated in the portion of the tree being compressed.

The blades 1 and 2 are secured by flat portions 15 and 18 in holders 19 and 20 respectively by clamping plates 22 and 23 and bolts 25 and 26. The troughs 4 and 6 terminate at the flat portions 15 and 18. The bolts 25 and 26 extend through clearance holes (not shown) in the clamping plates 22 and 23 and blades 1 and 2, and are screwed into threaded holes (not shown) in the holders 19 and 20. The holders 19 and 20 are each slidably mounted by T-flanges, one of which is shown and designated 28, in a T-slot 29 in a mounting bar 30. It will be appreciated that, although not shown, the end stops are provided at each end of the T-slot 29 to prevent the T-flange 28 from sliding out of the ends of the T-slot 29.

The holders 19 and 20 are pivotally attached to an oil operated, double acting piston 32 and cylinder 33 by pivots 35 and 36 respectively. The cylinder 33 is connected by means not shown to the conventional pressurized oil feed of a tractor.

In operation the blades 1 and 2 are mounted as shown in FIG. 1 and then moved to position a tree (not shown) to be felled between them, the piston 32 and cylinder 33 are then activated to move the blades 1 and 2 together along paths which are substantially straight when viewed in a horizontal direction. As the blades 1 and 2 move together the portion of the tree between the tree cutting edges 16 and 17 is compressed between troughs 4 and 6 to alleviate splitting. It will be appreciated that the splitting is alleviated in this manner at the expense of further splitting being incurred in the stump dependent undersides of the blades 1 and 2, but this is not objectionable because the stump is not utilized.

The blades 1 and 2 may be activated by a different mechanism, for example, the blades 1 and 2 may be pivotally mounted on a scissor-type mechanism to move along horizontal paths. The tree cutting edges 16 and 17 are shown shaped by chamfering both side faces of each blades 1 and 2, however, other shapes of cutting edges may be used such as, for example, cutting edges formed by chamfering the blades on one side only.

In FIG. 2 similar parts to those shown in FIG. 1 are designated by the same reference numerals, and the previous description is relied upon to describe them.

A blade 38 has a trough 40 with outwardly inclined sides 42 and 44 leading from a trough bottom 46. The trough bottom 46 is V-shaped in cross-section in this embodiment, instead of being U-shaped in cross-section as in the previous embodiment. As in the previous embodiment the trough bottom 46 inclines downwardly towards a tree cutting edge 48 forming an open end of the trough 40, for compressing a portion of a tree between them during cutting.

Two blades similar to blade 38 are mounted in the same manner as the blades 1 and 2 are shown mounted in FIG. 1 in holders 19 and 20, and are used in the manner previously described with reference to FIG. 1. The blade 38 tends to compress the portion of a tree to a greater extent than the blades 1 and 2 (FIG. 1) because of the V-shaped trough bottom 46.

Whilst the troughs shown in FIGS. 1 and 2 are tapered to increase in cross-section towards the cutting edges, it is within the scope of the invention to use blades having troughs of uniform cross-section.

A possible explanation why the tree does not tend to split when it is compressed between the troughs is that the wood is compressed more or less radially inwardly.

Using trough-shaped blades according to the invention has the advantage that more wood can be included in the stem because of the convex shaped end of the harvested wood, than is harvested by conventional flat blades.

What is claimed is:

1. Tree cross-cutting blade assembly, wherein at least a portion of each blade is of uniform thickness and is trough-shaped with dependent lower sides, each trough having outwardly inclining sides leading upwardly from a trough bottom, with the trough bottom extending downwardly along an incline towards and terminating at a tree cutting edge of that blade, and the tree cutting edge forming an open end of that trough, and mounting means mounting the blades for movement towards one another along paths, which are substantially straight when viewed in an horizontal direction, for compressing a tree being cut by the cutting edges, in the troughs, by the top surface which is inclined with respect to the direction of motion, thereby causing more splitting of the portion of the tree adjacent the lower dependent sides than that adjacent the upper inclined sides of the blades.

2. Tree cross-cutting blade assembly according to claim 1, wherein each trough is U-shaped in cross-section.

3. Tree cross-cutting blade assembly according to claim 1, wherein each trough is V-shaped in cross-section.

4. Tree cross-cutting blade assembly, according to claim 1, wherein each trough is tapered to increase in cross-section towards the cutting edge.

5. Tree cross-cutting blade assembly according to claim 1, wherein each trough terminates at a flat clamping portion of that blade for the mounting means.

* * * * *